(12) United States Patent
Evans et al.

(10) Patent No.: US 6,845,178 B1
(45) Date of Patent: Jan. 18, 2005

(54) AUTOMATIC SEPARATION OF SUBJECT PIXELS USING SEGMENTATION BASED ON MULTIPLE PLANES OF MEASUREMENT DATA

(75) Inventors: Frank Evans, Dundee, OR (US); Mark Singer, Tualatin, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 09/892,937

(22) Filed: Jun. 27, 2001

(51) Int. Cl.[7] ................................................ G06K 9/62
(52) U.S. Cl. .................... 382/216; 348/128; 348/130; 348/131; 382/141; 382/165; 382/170; 382/218; 382/278; 250/559.39; 250/559.41; 250/559.42; 250/559.44; 250/559.45
(58) Field of Search ............................ 382/140–144, 382/151, 155, 209, 216–219, 278–279, 283, 284, 287, 165, 169, 170; 348/125–137; 250/559.39, 559.4, 559.41, 559.42, 559.43, 559.44, 559.45

(56) References Cited

U.S. PATENT DOCUMENTS

| | | | |
|---|---|---|---|
| 5,077,806 A | | 12/1991 | Peters et al. |
| 5,640,200 A | * | 6/1997 | Michael ........................ 348/87 |
| 5,850,466 A | * | 12/1998 | Schott ......................... 382/141 |
| 5,969,753 A | | 10/1999 | Robinson |
| 6,005,977 A | * | 12/1999 | Tanimizu et al. ............ 382/216 |
| 6,023,530 A | * | 2/2000 | Wilson ......................... 382/219 |
| 6,075,883 A | * | 6/2000 | Stern et al. .................. 382/144 |
| 6,075,905 A | * | 6/2000 | Herman et al. .............. 382/284 |
| 6,243,599 B1 | * | 6/2001 | Van Horn ..................... 600/407 |
| 6,259,827 B1 | * | 7/2001 | Nichani ....................... 382/291 |
| 6,304,670 B1 | * | 10/2001 | Berestov ...................... 382/162 |
| 6,344,897 B2 | * | 2/2002 | Miyazaki et al. ......... 356/237.4 |
| 6,349,113 B1 | * | 2/2002 | Mech et al. ............ 375/240.08 |
| 6,396,949 B1 | * | 5/2002 | Nichani ....................... 382/173 |
| 6,630,996 B2 | * | 10/2003 | Rao et al. ................. 356/237.5 |

* cited by examiner

*Primary Examiner*—Bhavesh M. Mehta
*Assistant Examiner*—Gregory Desire
(74) *Attorney, Agent, or Firm*—Young & Basile, P.C.

(57) ABSTRACT

A method and apparatus for characterizing pixels in an image of an object surface by providing at least two images of the surface wherein each pixel has a unique location common to all of the images; comparing each pixel value at each location to an identification matrix; and identifying the region in which each pixel is located based on the comparison. The matrix can comprise a plurality of non-pixel values representing one or more regions, each of the regions defining at least one surface attribute. One embodiment provides at least two references images of a template using the same technique used to obtain each image of the surface, and creating the matrix using the reference images. Providing at least two images comprises providing a first and second image, wherein the surface is illuminated using a first and second source of illumination, or providing the first using a source of illumination and providing the second from the first.

31 Claims, 2 Drawing Sheets

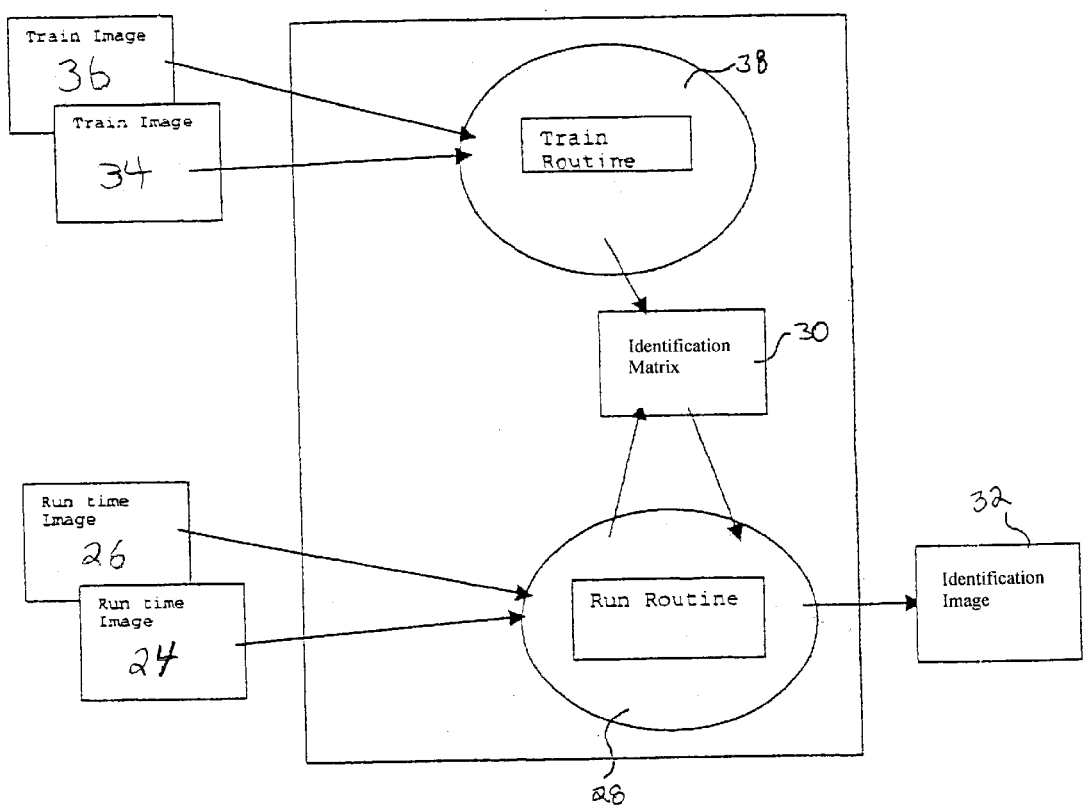

AUTOMATIC SEPARATION OF SUBJECT PIXELS USING SEGMENTATION BASED ON MULTIPLE PLANES OF MEASUREMENT DATA

BACKGROUND OF THE INVENTION

1. Field of the Invention

The invention relates to machine vision processing of image data and, more specifically, to separating pixels of an image into regions based on multiple planes of measurement data.

2. Description of the Related Art

In image processing it is desirable to know the qualitative aspects of a surface, which may be independently important or may provide important information for later processing. For example, whether the surface contains a scratch or pitting, or where a particular material occurs in or on the surface, can be important for quality control in mass production applications.

Heretofore, no strong technology existed to qualitatively evaluate data. One common machine vision technique separates pixels into regions based on intensity thresholds. Basically, the processing compares the value of each pixel of an image to a reference value. If the pixel value is above the reference value, the pixel is determined to be in one region of the surface, and if the pixel value is below or equal to the reference value, the pixel is determined to be in a second region of the surface. The use of a single image to identify regions causes errors where regions overlap. In addition, separating pixels at the edge of a surface region using thresholding techniques tends to be inaccurate.

Sometimes multiple images of the surface are obtained and compared to more than one reference value. However, even in the presence of multiple measurement thresholds, the thresholds are applied to the individual measurements, and then the result is analyzed. Thus, thresholding techniques do not typically allow separating regions of a surface from one another that overlap one another when measured by either image alone.

SUMMARY OF THE INVENTION

The present invention characterizes a surface into various qualitative attributes by separating pixels comprising an image of the surface into regions representing the attributes. Specifically, the method of the present invention of characterizing a plurality of pixels in an image of an object surface comprises: providing at least two images of the object surface using at least one technique wherein each pixel has a unique location common to all of the images; comparing a value of each pixel at each unique location to an identification matrix, wherein the identification matrix includes one or more regions defined by a plurality of pixel values; and identifying the region in which each pixel is located based on the results of the comparison. The regions can represent qualitative aspects of the surface.

In one embodiment of the invention, the method further comprises providing at least two reference images of at least one template using the same technique used to obtain each image of the object surface and creating the identification matrix using the reference images.

Preferably, creating the identification matrix is performed using statistical methods. The identification matrix can be implemented as one or more lookup tables. The value of a pixel can be its eight-bit gray scale value, or some other quantity.

The apparatus of the present invention comprises: means for providing at least two images of the object surface using at least one technique wherein each pixel has a unique location common to all of the images; means for comparing a value of each pixel at each unique location to an identification matrix, wherein the identification matrix includes one or more regions defined by a plurality of pixel values; and means for identifying the region in which each pixel is located based on the results of the comparison.

In another embodiment of the apparatus of the present invention, the apparatus comprises: means for providing at least two images of the object surface using at least one technique wherein each pixel has a unique location common to all of the images; a processor configured for a comparison of a value of each pixel at each unique location to an identification matrix, wherein the identification matrix includes one or more regions defined by a plurality of pixel values; and the processor configured to identify the region in which each pixel is located based on the results of the comparison.

The two or more images of the object surface and the template surfaces are created using a variety of techniques to vary the values of the pixels while maintaining a unique location for each pixel. In one embodiment, a first image is provided by a camera while the surface is illuminated using a first source of illumination, and a second image is provided by the camera while the surface is illuminated using a second source of illumination. The first and second sources of illumination can be lasers, LED illuminators, or bright-field and dark-field illuminators. Alternately, a first image is provided by the camera using one source of illumination, such as normal lighting, and a second image is provided from the first image by manipulating the data of the first image as by, for example, calculating a variance for each pixel of the first image and using the variances so calculated as the values for the second image.

The present invention separates pixels of an object surface into regions, which regions represent qualitative aspects of the object surface. It compares the values of the pixels to measurement data segmented into regions using statistical techniques. As a result, machine vision processing of pixels should be more accurate using the present invention than processing performed using the thresholding techniques of the prior art.

BRIEF DESCRIPTION OF THE DRAWINGS

FIG. 2 shows a flow diagram of the method of separating pixels according to the present invention.

DETAILED DESCRIPTION

The present invention provides an apparatus and method for characterizing features of a surface being examined into different qualitative attributes, such as a scratch or a diffusive material. This is performed by separating each pixel location comprising an image of the surface into regions representing the different qualitative attributes. At least two images of the surface are used wherein the location of each pixel of each image is the same, but the values of the pixels at each location may be different. The images are created using a variety of techniques. The set of pixel values for each unique location is compared to an identification matrix, which includes reference sets of pixel values and their corresponding regions. Each pixel, i.e., each unique pixel location, is then assigned to a region based on the results of the comparison.

In a preferred aspect of the invention, a train routine is performed where the identification matrix is created using at least two reference images of a template incorporating a qualitative attribute expected on the surface. The reference images are created using the same technique to be used in providing the two or more surface images. Multiple templates, each containing a different qualitative attribute, can be incorporated into the train routine. The pixel values obtained from the reference images are combined into regions using statistical techniques.

Figure 1:
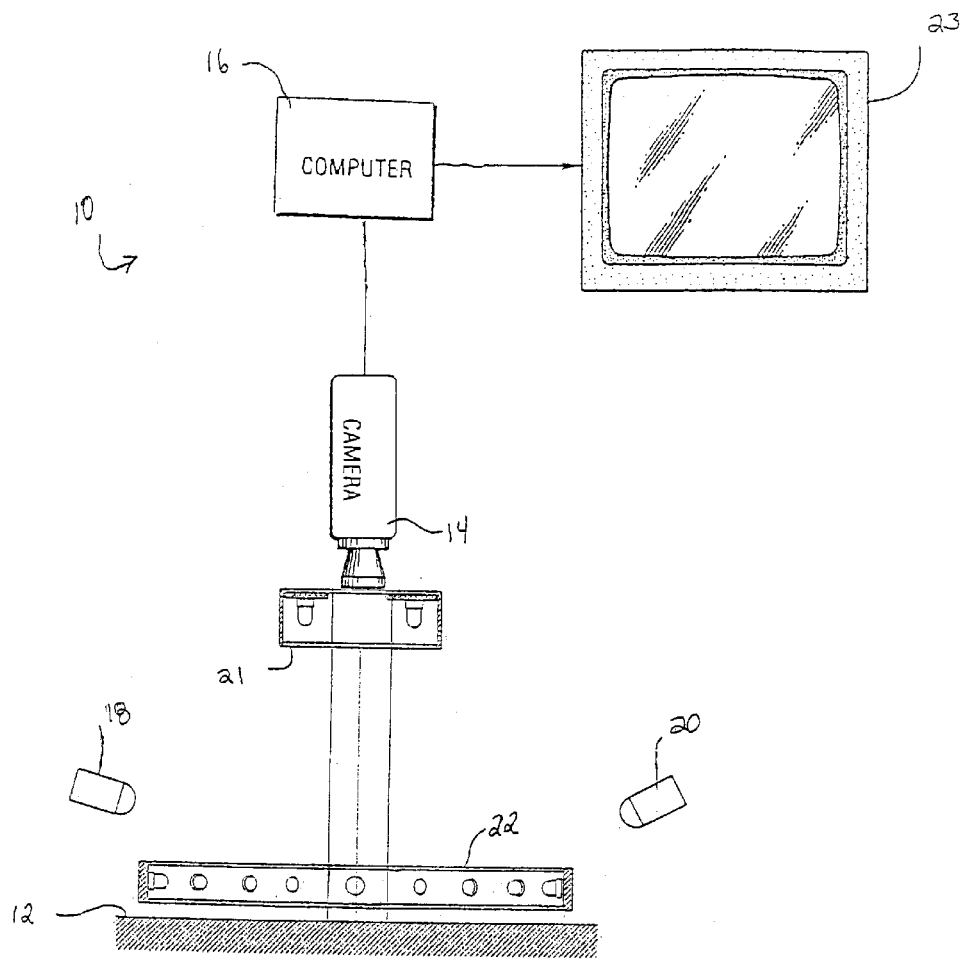
FIG. 1 is a pictorial representation of a machine vision system of the present invention.

Described in reference to the figures, in FIG. 1 there is shown a machine vision system 10 capable of providing, i.e., creating, images of the surface 12 of an object and using the images to separate the object surface 12 into dirt defined regions. The vision system 10 includes a camera 14 positioned perpendicularly above the object surface 12. The camera 14 preferably is a digital camera that captures a picture, which picture is an eight-bit gray scale image having 256 different shades of gray, valued between 0 and 255. The images output from the camera 14 are made up of pixels, each pixel having a value and a unique location. In the preferred embodiment, a CCD or CMOS camera is used. Such cameras are available for purchase from Opteon. In another embodiment, a non-digital camera may be used, and each picture captured is subsequently digitized into an eight-bit gray scale image. While eight-bit gray scale imaging is preferred, in certain applications it may be desirable to use another brightness scale. The invention can also be implemented with color imaging.

Each picture taken by the camera 14 is output to a computer 16, where it is stored as an image. The computer 16 is a standard computer, incorporating a central processing unit (CPU), read-only memory, random access memory, input/output control circuitry, and analog-to-digital conversion circuitry. Each image is a stream of measurement data reflecting the location and value of each pixel comprising the image. In one embodiment of the invention, the computer 16 controls a video output 23, which displays the image data.

The two or more images of the object surface 12 are created such that the location of the pixels in each image is the same, but the value of the pixels in each image may be different. One technique capable of producing different pixel values for the same pixel location is incorporating different lighting into each image created using the camera 14. The value of each pixel in this technique is its gray scale value, and creating each image using different lighting conditions varies the values. In one embodiment of the invention that uses this technique, two sources of illumination are provided by light sources 18 and 20. Preferably, the light sources 18 and 20 are thin-line lasers having a width of 10 microns and may be of the type available from Lasiris, located in Montreal, Canada. Alternately, the light sources 18 and 20 can be LED illuminators. In another embodiment of the invention, two sources of illumination are provided by a bright-field illuminator 21 and a dark-field illuminator 22. Illuminators 21 and 22 are ring lights of the type available from Advanced Illumination in Rochester, Vt.

These embodiments are by example only. Because each image in these embodiments is created incorporating different conditions, more than two sources of illumination can be included in yet another embodiment. By example, the apparatus can incorporate both light sources 18 and 20 and illuminators 21 and 22, and each of these sources of illumination can be used to create an image. Also by example, the vision system 10 can incorporate three or more sources of illumination of the type represented by light sources 18 and 20.

Another technique capable of producing different pixel values is creating a first image using the camera 14 and performing calculations using the data of the image to create one or more additional images from the first image. Preferably, the calculations are performed by the computer 16. The value of the pixels in an image created using the camera 14 are their gray scale values. Pixels in an image created from this image have values that depend upon the calculation performed. By example, a second image can be created from the first by calculating a variance for each pixel over a specified number of pixels. The value of each pixel in the second image is the variance. In an embodiment of the invention using this technique, only one source of illumination is required to create the first image. This source of illumination could be normal lighting.

With reference to FIG. 2, the vision system 10 creates at least two images of the object surface 12. In a preferred embodiment, the images are created using the camera 14. Run-time image 24 is a image of the object surface 12 illuminated by one of the sources of illumination, such as light source 18. Alternatively, run-time image 24 is the object surface 12 illuminated using the bright-field illuminator 20. Then, run-time image 26 is created with the camera 14 using a second source of illumination. In one embodiment, when the first source of illumination used is light source 18, then the source of illumination for run-time image 26 is light source 20. In another embodiment, when the source of illumination used to illuminate run-time image 24 is the bright-field illuminator 20, then the second source used to illuminate run-time image 26 is the dark-field illuminator 22. In another embodiment of the invention, run-time image 24 is created using the camera 14 and ordinary illumination, and run-time image 26 is created from run-time image 24 by performing calculations using the data of run-time image 24. By example, run-time image 26 can represent a mapping of the texture of the run-time image 24, i.e., the variance of each pixel compared to a predetermined number of adjacent pixels, using a routine preferably incorporated into software operated by the computer 14.

Although the invention is described in reference to two images of the object surface 12, additional images can be created, providing an increasing number of variables for comparison to a reference matrix of values. As mentioned, more than two sources of illumination can be used. In addition, more than one run-time image can be created from run-time image 24 by mapping other characteristics of the image. Also by example, run-time images 24 and 26 can be created using the camera and the bright-field 21 and dark-field 22 illuminators, respectively, and two additional run-time images can be created from run-time images 24 and 26 by mapping the texture of each image as described above. If desirable, each image can be preprocessed according to a number of known techniques.

The images created have the same physical pixel locations, but the values of some or all of the pixels at each unique location differ in each run-time image. The pix values obtained from each run-time image are used in a run routine 28 to characterize each pixel as representing one defined region or another. Specifically, the values of each pixel at a unique location are compared to a known identification matrix 30, described herein. The result of this comparison is an identification image 32, which provides a map specifying to which region each pixel location belongs. Such an identification image 32 can be in the form of a printout, or mapped image displayed on the video 23.

Figure 3:
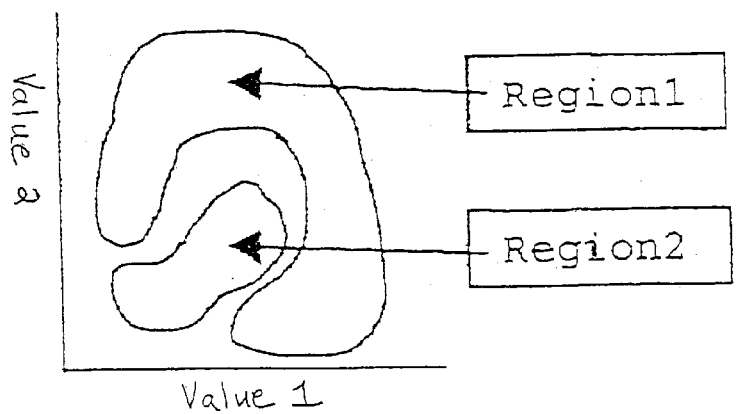
FIG. 3 shows a graphical representation of two regions of a two measurement identification matrix used in the present invention.

The identification matrix 30 is a matrix defined by columns and rows, the columns and rows representing possible pixel values contained in the images of the object surface 12 corresponding to defined regions, or segments. The regions of the identification matrix 30 represent various qualitatively identifiable attributes that may be present on the object surface 12. For example, some regions of the object surface 12 that may be represented in the identification matrix 30 are changes in surface material and three-dimensional attributes, such as a scratch. A graphical representation of two regions, which data could be incorporated into a two-measurement identification matrix used for the comparison in the run routine 28, is illustrated in FIG. 3. Region 1 and Region 2 represent specific attributes that may be present in the object surface 12. By example, Region 1 comprises the plurality of pixel values that characterize a scratch, while Region 2 comprises those pixel values characterizing an unmarred surface. Alternatively, Region 1 represents the plurality of pixel values characterizing a specular surface material, while Region 2 represents those characterizing a diffusive material. The identification matrix 30 can also comprise more than two regions. For example, one region can represent pixel values associated with the presence of a metal coating, a second region can represent pixels values associated with an uncoated metal, and a third region can represent pixel values associated with a corroded material.

The identification matrix 30 is used by the run routine 28 to separate subject pixels into the various defined regions. To characterize the subject pixel, a first pixel value is obtained for the pixel from run-time image 1, and a second pixel value is obtained for the pixel from run-time image 2. If more than two images are used, additional pixel values are obtained. Then, a look-up is performed where it is determined whether the pixel values so obtained are in one defined region or another. By example to the two region matrix 30 of FIG. 3, Value 1, which corresponds to the first value of the subject pixel obtained from run-time image 24, is plotted on the x-axis. Value 2, which corresponds to the second value of the subject pixel obtained from run-time image 26, is plotted on the y-axis. The region in which the two values intersect indicates in which region, Region 1 or Region 2, the subject pixel belongs. By example, Values 1 and 2 associated with location (1,1) could be 50 and 70, respectively. Comparing these values to those in the identification matrix 30 produces the result in the identification image 32 that the pixel at location (1,1) is in Region 2, for example. In contrast, if Values 1 and 2 associated with location (1,1) are 50 and 150, respectively, then the comparison of these values to those in the identification matrix 30 produces the result in the identification image 32 that the pixel at location (1,1) is in Region 1, for example.

Although the identification matrix 30 shown in FIG. 3 is roughly square-shaped and two-dimensional, it is understood that the identification matrix 30 is not necessarily square and that it can contain three or more dimensions. Of course, the identification matrix 30 is shown as a graphical representation of regions by example only. Preferably, the identification matrix 30 is implemented as one or more look-up tables. The identification matrix 30 can also be implemented via software in a CPU.

Returning now to FIG. 2, the identification matrix 30 is preferably developed using a train routine 38. The train routine 38 creates images using one or more sample objects or templates, each template containing a surface attribute that may be seen in or on the object surface 12. One attribute can be, for example, a three-dimensional feature, such as a scratch. Another attribute presented by a template can be different materials of which the object surface 12 is made. The train routine 38 creates the same number of images of each template using the same technique to be used in the subsequent run routine 28. By example to a two measurement identification matrix, a first image of the template, train image 34, is created the same way run-time image 24 is to be created during the run routine 28. Similarly, the second image of the template, train image 36, is created the same way run-time image 26 is to be created. If more than two images are to be used in the run routine 28, additional images are used in the train routine 38. This procedure repeats for each template until all of the surface attributes of interest that may be seen in or on the object surface 12 are incorporated into the train routine 38. All of these images can be preprocessed using a variety of standard techniques.

Which technique is used to create the images for the train routine 38 and the run routine 28 depends upon the surface attributes of interest. Certain attributes are seen by varying the lighting used to create each image. By example to a two measurement embodiment, a three-dimensional attribute, such as a scratch, is readily seen by creating two images, each image using one of the light sources 18 and 20. Diffusive and specular portions of a surface are seen by creating two images, each image created using one of the bright-field 20 and dark-field 22 illuminators. The illuminators 20 and 22 also make it possible to separate small depressions in the specular surface. Other attributes are better seen using other techniques. Also by example, changes in materials comprising a surface can be seen by creating a first image using the camera 14 with normal lighting conditions and creating a second image by calculating the variance of each pixel.

The values of each pixel of each train image are combined in the train routine 38 to create regions, by example, Regions 1 and 2 of FIG. 3. As explained, the regions represent the plurality of pixel values typical for each surface attribute presented by the template(s). The regions are created by segmenting the data obtained from the template(s) using statistical techniques. By example to one embodiment of the invention, train image 24 is created using the camera 14 with normal lighting conditions, and train image 26 is created from train image 24 by mapping the texture of the image. In this embodiment, the brightness of a pixel from train image 24 and the variance of the same pixel from train image 26 are compared to other values for other pixels to determine the co-occurrence of measurement values in the various pixels using an array of counters, i.e., a two dimensional histogram of values. Then, a segmentation occurs where the regions on the matrix that have the highest probability of co-occurrence are determined by a cluster analysis. One statistical clustering technique that can be used in this analysis is described in K. Gowda and G. Krishna, "Disaggregative Clustering Using the Concept of Mutual Nearest Neighborhood," published in *IEEE Transactions on Systems, Man, and Cybernetics*, Volume SMC-8, No. 12, December 1978, pp. 888–895.

The regions are characterized into various surface attributes using a priori knowledge regarding the template (s). By example, one template is used that contains three regions, a metal coating, an uncoated metal, and a corroded metal. In the example above, high brightness values for pixels in train image 24 and high variance values for the same pixels in train image 26 indicates one region characterized by a rough textured, bright surface. Pixels in this region are qualitatively characterized as being in the region with a metal coating. In contrast, high brightness values for pixels in train image 24 and low variance values for the same pixels in train image 26 indicate an untextured, bright surface region. These pixel values represent the region of uncoated metal. Finally, low brightness values for pixels in train image 24 and high variance values for the same pixels in train image 26 indicate a textured surface that is not bright. Pixels in such a region represent the corroded surface.

The present invention provides a novel method of separating pixels into various regions segmented based on multiple planes of measurement data. This method allows differentiation of characteristics of a surface with more precision than used in standard thresholding techniques of image processing. Although the invention is described generally using a two-measurement example, it is understood that increasingly complex discrimination is possible with additional measurements.

Having fully described the preferred embodiment of the invention, variations and modifications may be employed without departing from the scope of the present invention. Accordingly, the following claims should be studied to learn the true scope of the present invention.

What is claimed is:

1. A method of characterizing a plurality of pixels in an image of an object surface comprising:

providing at least two images of the object surface using at least one technique wherein each pixel has a unique location common to all of the images;

comparing a value of each pixel at each unique location to a plurality of pixel values comprising at least two axes of an identification matrix, wherein the identification matrix comprises a plurality of non-pixel values representing one or more regions, each of the regions defining at least one surface attribute; and identifying a region associated with each pixel based on the results of the comparison.

2. The method of claim 1, further comprising:

providing at least two reference images of at least one template using the same technique used to obtain each image of the object surface; and creating the identification matrix using the reference images.

3. The method of claim 2, wherein creating the identification matrix is performed using statistical methods.

4. The method of claim 1, wherein providing at least two images comprises:

providing a first image, wherein the object surface is illuminated using a first source of illumination; and providing a second image, wherein the object surface is illuminated using a second source of illumination.

5. The method of claim 4, wherein the first source of illumination and the second source of illumination are LED illumination.

6. The method of claim 4, wherein the first source of illumination and the second source of illumination are lasers.

7. The method of claim 4, wherein the first source of illumination is a bright-field illuminator and the second source of illumination is a dark-field illuminator.

8. The method of claim 1, wherein providing at least two images comprises:

providing a first image, wherein the object surface is illuminated using a source of illumination; and creating a second image using pixel values from the first image.

9. A method of characterizing a plurality of pixels in an image of an object surface comprising:

providing at least two images of the object surface using at least one technique wherein each pixel has a unique location common to all of the images wherein providing at least two images comprises providing a first image wherein the object surface is illuminated using a source of illumination; and providing a second image from the first image comprising calculating a variance for each pixel of the first image;

comparing a value of each pixel at each unique location to an identification matrix, wherein the identification matrix includes one or more regions defined by a plurality of pixel values; and identifying the region in which each pixel is located based on the results of the comparison.

10. The method of claim 1, wherein the value of each pixel is its eight-bit gray-scale value.

11. An apparatus for characterizing a plurality of pixels in an image of an object surface comprising:

means for providing at least two images of the object surface using at least one technique wherein each pixel has a unique location common to all of the images;

means for comparing a value of each pixel at each unique location to a plurality of pixel values comprising at least two axes of an identification matrix, wherein the identification matrix comprises a plurality of non-pixel values representing one or more regions, each of the regions defining at least one surface attribute; and means for identifying a region associated with each pixel based on the results of the comparison.

12. The apparatus of claim 11, wherein the means for providing at least two images comprises a camera for providing a first image, wherein the object surface is illuminated using a first source of illumination, and the camera providing a second image, wherein the object surface is illuminating using a second source of illumination.

13. The apparatus of claim 12, wherein the first source of illumination and the second source of illumination are LED illuminators.

14. The apparatus of claim 12, wherein the first source of illumination and the second source of illumination are lasers.

15. The apparatus of claim 12, wherein the first source of illumination is a bright-field illuminator and the second source of illumination is a dark-field illuminator.

16. The apparatus of claim 11, wherein the means for providing at least two images comprises:

a camera for providing a first image, wherein the object surface is illuminated using a source of illumination; and means for creating a second image using pixel values from the first image.

17. The apparatus of claim 11, wherein the identification matrix is at least one lookup table.

18. An apparatus for characterizing a plurality of pixels in an image of an object surface comprising:

means for providing at least two images of the object surface using at least one technique wherein each pixel has a unique location common to all of the images;

a processor configured for a comparison of a value of each pixel at each unique location to a plurality of pixel values comprising at least two axes of an identification matrix, wherein the identification matrix comprises a plurality of non-pixel values representing one or more regions, each of the regions defining at least one surface attribute; and the processor configured to identify a region associated with each pixel based on the results of the comparison.

19. The apparatus of claim 18, wherein the means for providing at least two images comprises a camera for providing a first image, wherein the object surface is illuminated using a first source of illumination, and the camera providing a second image, wherein the object surface is illuminated using a second source of illumination.

20. The apparatus of claim 18, wherein the means for providing at least two images comprises:

a camera for providing a first image, wherein the object surface is illuminated using a source of illumination; and the processor configured to create a second image using pixel values from the first image.

21. A method of characterizing a plurality of pixels in an image of an object surface comprising:

providing a first image of the object surface using a first technique;

providing a second image of the object surface using a second technique, and wherein each pixel has a unique location common to the images;

comparing a first value of a subject pixel from the first image with a first axis of an identification matrix, the first axis including a first plurality of pixel values;

comparing a second value of the subject pixel from the second image with a second axis of the identification matrix, the second axis including a second plurality of pixel values; wherein the identification matrix comprises a plurality of non-pixel values representing at least two regions, each of the regions corresponding to at least one surface attribute; and identifying a region with which the pixel is associated based on the results of the comparisons.

22. The method according to claim 21 further comprising:

providing a first reference image of at least one reference surface using the first technique;

providing a second reference image of the at least one reference surface using the second technique;

creating the identification matrix using the reference images.

23. The method of claim 21 wherein providing the first image of the object surface using the first technique comprises creating the first image by illuminating the object surface using a first source of illumination; and wherein providing the second image of the object surface using the second technique comprises creating the second image by illuminating the object surface using a second source of illumination.

24. The method of claim 23 wherein the first source of illumination and the second source of illumination are LED illuminators.

25. The method of claim 23 wherein the first source of illumination and the second source of illumination are lasers.

26. The method of claim 23 wherein the first source of illumination is a bright-field illuminator and the second source of illumination is a dark-field illuminator.

27. The method of claim 21 wherein providing the first image of the object surface using the first technique comprises creating the first image by illuminating the object surface using a first source of illumination; and wherein providing the second image of the object surface using the second technique comprises creating the second image by calculating a variance for each pixel of the first image.

28. The method of claim 21 wherein the identification matrix is a look-up table and the first axis is associated with columns of the look-up table and the second axis is associated with rows of the look-up table; and wherein the plurality of non-pixel values comprises identifiers unique to each of the regions.

29. The method of claim 28 wherein identifying the region with which the pixel is associated based on the results of the comparisons comprises selecting a column based on the first value of the subject pixel, selecting a row based on the second value of the subject pixel and selecting an identifier located at an intersection of the column and the row.

30. The method of claim 21 further comprising:

providing a third image of the object surface using a third technique; and comparing a third value of the subject pixel from the third image with a third axis of an indentification matrix, the third axis comprising a third plurality of pixel values.

31. The method of claim 30 wherein providing the first image of the object surface using the first technique comprises creating the first image by illuminating the object surface using a first source of illumination; and wherein providing the second image of the object surface using the second technique comprises creating the second image by illuminating the object surface using a second source of illumination; and wherein providing the third image of the object surface using the third technique comprises creating the third image by calculating a variance for each pixel of one of the first and the second image.

* * * * *